United States Patent [19]
Marcoux

[11] 3,756,736
[45] Sept. 4, 1973

[54] DRILL BUSHING SYSTEM

[75] Inventor: Arthur Marcoux, Hermosa Beach, Calif.

[73] Assignee: McDonnell Douglas Corporation, Santa Monica, Calif.

[22] Filed: Mar. 2, 1972

[21] Appl. No.: 231,258

[52] U.S. Cl. ............. 408/14, 408/72 B, 408/241 B
[51] Int. Cl. ............................................ B23b 45/14
[58] Field of Search .................. 408/14, 72 R, 72 B, 408/241 R, 241 B, 115 B

[56] References Cited
UNITED STATES PATENTS

| | | |
|---|---|---|
| 3,336,822 | 8/1967 | Armacost .......................... 408/241 B |
| 1,831,813 | 11/1931 | Levedahl .......................... 408/241 B |

*Primary Examiner*—Gil Weidenfeld
*Attorney*—Walter J. Jason, Robert O. Richardson et al.

[57] ABSTRACT

A drill bushing system for power-fed rotary cutters wherein the tool is releasably locked to the drill bushing in a drill bar to permit power-feeding without separation of the cutter from the bushing during the cutting operation. A novel sensing device is provided to regulate cutting depth even when the work surface is not normal to the cutter axis of rotation.

5 Claims, 5 Drawing Figures

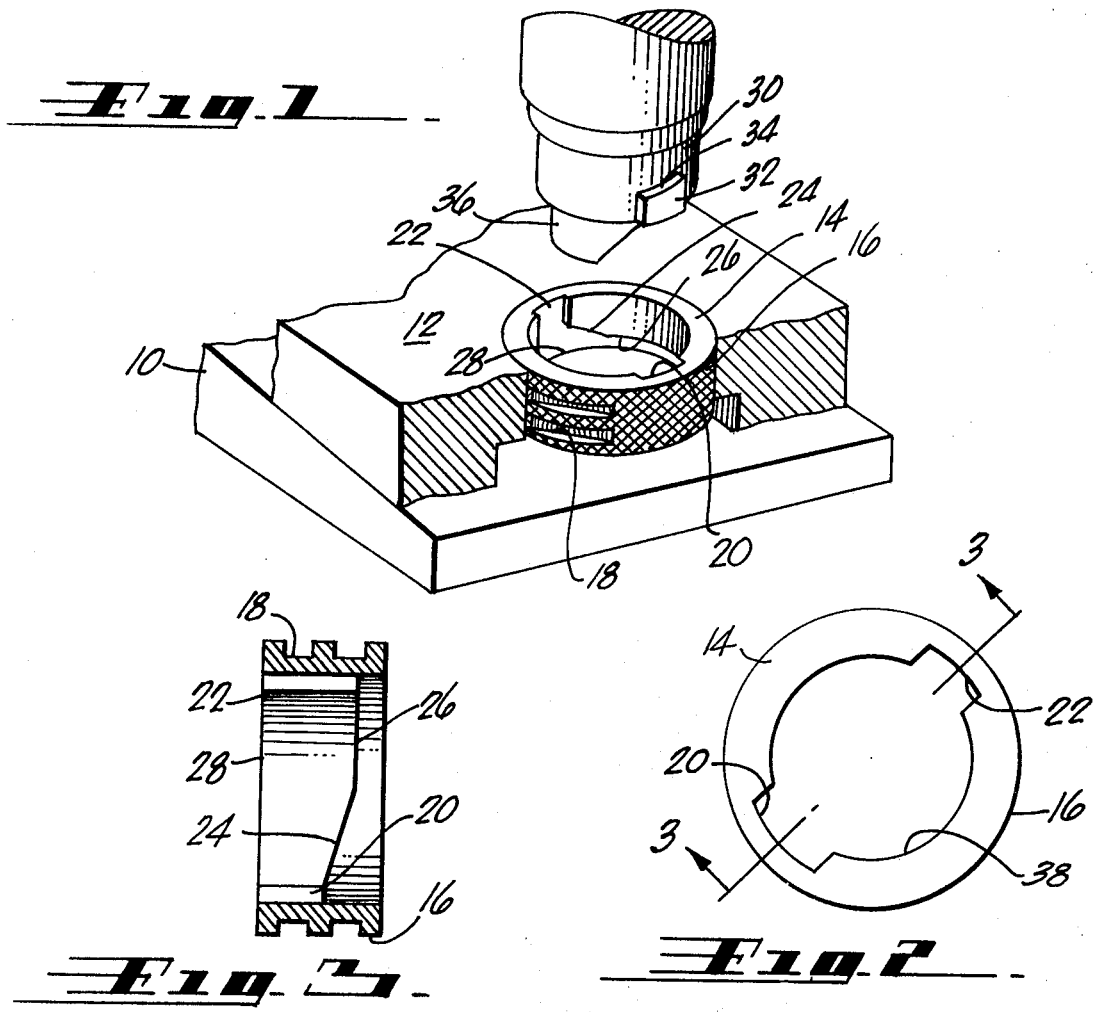
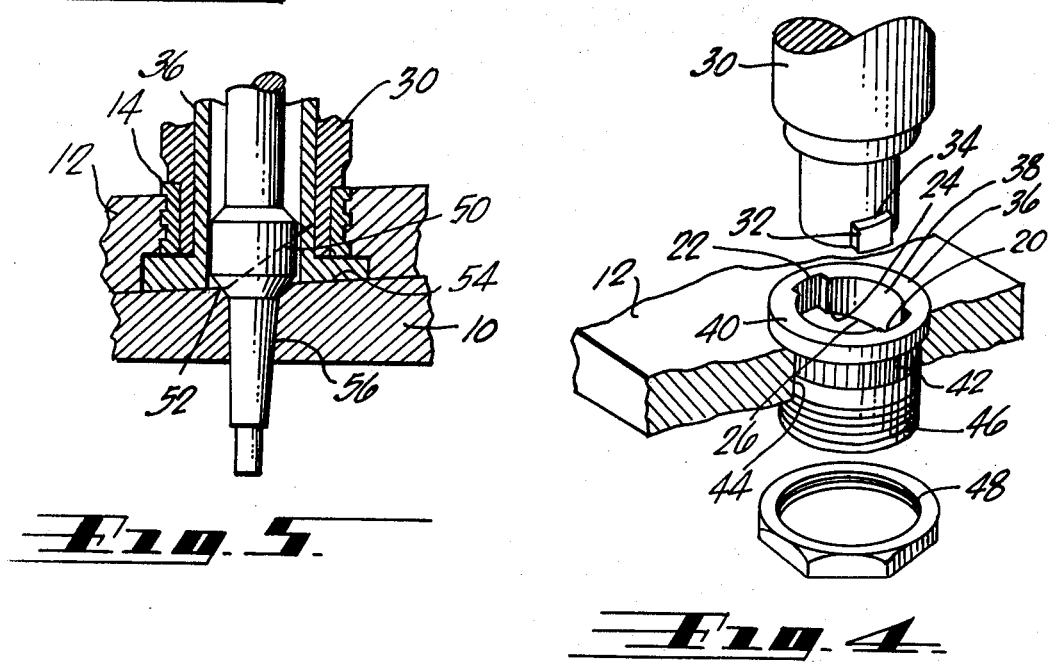

3,756,736

DRILL BUSHING SYSTEM

BACKGROUND OF THE INVENTION

Drill bushings are mounted in drill bars or templates to serve as a pattern or guide when placed over the workpiece. A cutter is then inserted into the bushing and onto the workpiece where it will perform a cutting function such as drilling, boring, countersinking or other desired hole-forming function. If the workpiece is of thin gauge or of a soft material, the drill may be hand-held and manually pushed as the cutter performs its operation. However, when the workpiece is relatively thick or is of a hard material, the cutter must be power-fed into the workpiece as it performs its cutting function. Therefore, assuming that the drill bar is connected securely to the workpiece and the drill bushing is connected securely in the drill bar, there must be an interconnection between the drill bushing and a drill tool support in order that the power-fed drill can exert a downward pressure onto the workpiece as it performs its cutting operation. In one such accomplishment known to the inventor, the nose piece of the drill tool support was provided with outwardly extending ears which engaged bayonet-type slots in the inner walls of the drill bushing to permit the ears to pass through and upon rotation, lock the drill to the bushing. One objectionable feature in this arrangement was that the ears on the drill tool support had to extend below the drill bushing and yet be positioned above the work part. This, then, necessitated a spacing between the part and the drill bushing which could be provided by an increased thickness in the drill bar in which the drill bushing was mounted.

SUMMARY OF THE PRESENT INVENTION

The drill bushing system of the present invention utilizes an improved drill bushing wherein indexed slots are provided diametrically across the opening of the drill bushing. These slots extend down into the drill bushing hole and communicate with a cam ramp formed in the inner wall forming the hole of the bushing. The cam ramp terminates in a ramp bottom spaced from the bottom of the drill bushing. Diametrically opposed index keys or ears are provided on the nose piece of the drill tool support. These ears have communicating ramp surfaces which engage with the cam ramp of the drill bushing on rotation after the index key of the drill tool support has been fitted into the slots in the inner walls of the drill bushing. Because the workpiece may be tapered and therefore have a work surface not normal to the axis of rotation of the cutter in the drill tool support, a sensing sleeve is provided in the drill tool support which passes down into the drill bushing and in contact with the lowermost surface of the tapered part below the drill bushing. This sensing sleeve then permits proper adjustments to be made with the drill tool support for a predetermined penetration of cut into the work part. To ensure that the sensor sleeve always contacts the lower side of the work surface, the slots in the drill bushing through which the index keys of the drill tool support must pass are of different widths, with the wider slot indicating the lower side of the workpiece for contact by the sensing sleeve. The index keys or ears on the drill tool support are also of different width. In this manner, a cut may be made of a predetermined depth on a tapered surface. One such example would be the countersinking of holes in a tapered wing skin for the placement of bolts so that the bolt heads would be flush-mounted.

BRIEF DESCRIPTION OF THE DRAWINGS

FIG. 1 is a perspective view partly in section showing the relationship of the nose piece of the drill tool support, the drill bushing, drill bar and workpiece;

FIG. 2 is a plan view of a drill bushing;

FIG. 3 is an elevational view partly in section of a drill bushing;

FIG. 4 is a perspective view of the drill bushing secured to the drill bar in an alternate manner; and FIG. 5 is a vertical sectional view showing the relationship of the sensing sleeve, drill tool support, drill bushing, tapered workpiece and drill bar.

DETAILED DESCRIPTION OF ILLUSTRATIVE EMBODIMENTS

Referring now to FIG. 1 there is shown a work part 10 having positioned thereover a drill bar 12. Mounted within an opening in the drill bar in the embodiment shown is a drill bushing 14. Its outer surface is knurled at 16 and has a plurality of slots 18 in order to retain the bushing 14 in the drill bar 12 by means of an appropriate potting compound applied in a manner well known in the art. This drill bushing 14 preferably may be of the same thickness as that of the drill bar 12 and has diametrically opposed index slots 20 and 22 extending along the inner wall of the bushing throughout its thickness. These slots have a different width as may be seen in the plan view of FIG. 2.

Referring now to FIG. 3, a diagonally extending cam ramp 24 communicating with the index slots 20 and 22 is positioned about midway through the thickness of the drill bushing. These cam ramps 24 terminate in the ramp bottom ledge 26 spaced from the bottom surface 28 of the drill tool support bushing 14. The nose piece of a drill or other cutting tool support 30 has diametrically opposed index keys or ears 32 protruding from its outer surface as shown in FIG. 1. The index keys have a ramp 34, the upper surface of which, when the nose piece 30 is rotated within the drill bushing, engages the cam ramp 24 and draws the nose piece snugly into contact with the drill bushing. Further rotation of the drill nose piece places the ramp 34 in contact with the bottom 26 of the ramp in an anti-rotating position.

FIG. 4 shows a drill bushing 36 embodying the present invention yet attached to drill bar 12 in a different manner. This drill bushing has the keyed slots 20, 22 on opposite sides of drill hole 38. Ramp 24 communicates with these slots and terminate in a bottom ledge 26 a in the first embodiment. Ears 32 with upper surface ramps 34 on the nose piece of drill tool support 30 are adapted to pass through the slots 20, 22 and upon rotation lock against ledge 26 in the bushing 36.

Bushing 36 has an upper lip or rim 40 which rests on the upper surface of drill bar 12. The outer wall 42 is serrated for a press fit in opening 44 of the drill bar and the lower end 46 is threaded to receive a nut 48 which is screwed on from underneath the drill bar 12.

The sensing sleeve 36 and its function with drill tool support 30 is best described in connection with the sectional view shown in FIG. 5. The lower surface 50 of sleeve 36 is tapered so that its lowest point 52 engages the low side of the irregular surface 54 of worpiece 10. The sensing sleeve and drill tool support has been oriented in this manner because of the different widths of the index key 32 on the drill tool support and slots 20 and 22 in the drill bushing as previously described. The cutting tool 56 shown here is for a tapered hole countersink on an irregular surface. Obviously, all types of rotary cutting tools may be used with this invention and the word "drill" as used herein should be interpreted broadly enough to include cutters, reamers, grinders, counterbore, countersink and similar metal cutting tools.

Having thus described an illustrative embodiment of the present invention, it is to be understood that modifications thereof will become apparent to those skilled in the art and it is to be understood that these deviations are to be construed as part of the present invention.

I claim:

1. A drill bushing system for power-fed rotary cutters comprising: a cutting tool support having a nose piece at one end thereof,
   a rotary cutter carried in said cutting tool support,
   a workpiece through which a hole is to be formed with said cutter,
   a drill bar securely positioned over said workpiece,
   said drill bar having a hole in alignment over said workpiece where said hole is to be formed,
   a drill bushing securely mounted in said drill bar hole,
   said drill bushing having a hole therein through which a cutting tool passes for cutting contact with said workpiece,
   a pair of slots disposed diametrically across said drill bushing hole in the inner surface wall thereof,
   said slots terminating in a cam ramp and ramp bottom spaced from the underside of said drill bushing,
   said nose piece having ears thereon adapted to pass through said slots and to be rotated along said cam ramp and against said ramp bottom to secure said cutting tool support to said drill bushing.

2. A drill bushing system as set forth in claim 1 wherein said slots and ears are of different width so that only one of said ears will pass through one of said slots.

3. A drill bushing system as set forth in claim 1 wherein said workpiece has a surface other than normal to the rotational axis of said cutting tool, and said cutting tool support has a sensing means thereon to determine the depth therefrom to the lowermost workpiece upper surface directly thereunder.

4. A drill bushing system as set forth in claim 1 wherein said sensing means is a sensing sleeve protruding down through said bushing to contact the lowermost upper surface of said workpiece.

5. A drill bushing system as set forth in claim 2 wherein said workpiece has a tapered surface under said bushing and the set of slots and ears having the greatest width is indexed to indicate the lowermost surface, and wherein said cutting tool support has a sensing sleeve adapted to pass through said bushing to contact said surface when said cutting tool support and said bushing are connected together.

* * * * *